United States Patent [19]
Chiba

[11] Patent Number: 5,523,988
[45] Date of Patent: Jun. 4, 1996

[54] OPTICAL PICKUP CONTROL APPARATUS

[75] Inventor: Takayoshi Chiba, Tokyo, Japan

[73] Assignee: Sony Corporation, Tokyo, Japan

[21] Appl. No.: 323,061

[22] Filed: Oct. 14, 1994

Related U.S. Application Data

[63] Continuation of Ser. No. 47,231, Apr. 14, 1993, abandoned.

[30] Foreign Application Priority Data

Apr. 16, 1992 [JP] Japan ................................. 4-096830

[51] Int. Cl.$^6$ ...................................... G11B 7/00
[52] U.S. Cl. ..................... 369/44.280; 369/47; 369/54; 369/58; 369/50
[58] Field of Search ................ 369/44.28, 44.27, 369/44.29, 44.34, 44, 11, 47, 48, 50, 53, 54, 58, 59, 124, 63; 360/10.1, 10.2, 64, 77.02; 358/907, 909, 342

[56] References Cited

U.S. PATENT DOCUMENTS

| | | | |
|---|---|---|---|
| 4,057,832 | 1/1977 | Kappert | 369/44.28 |
| 4,425,587 | 1/1984 | Kurata | 358/335 |
| 4,439,791 | 3/1984 | Hirata | 369/43 |
| 4,510,531 | 4/1985 | Sugiyama | 360/10.1 |
| 4,638,376 | 1/1987 | Sugiyama et al. | 360/10.1 |
| 4,833,664 | 5/1989 | Shiragami et al. | 369/44.27 |

FOREIGN PATENT DOCUMENTS 2088088A 3/1982 United Kingdom.
2083266A 3/1982 United Kingdom.
2103864A 2/1983 United Kingdom.

OTHER PUBLICATIONS

Patent Abstracts of Japan vol. 010 No. 035 (E–380), 12 Feb. 1986 & JP–A–60 191595 (Nippon Hoso Kyokai; Others: 01) 30 Sep. 1985.
Patent Abstracts of Japan vol. 006 192 (P–145), 30 Sep. 1982 & JP–A–57 103165 2 (Pioneer Electronic Corp; Others: 01) 26 Jun. 1982.

*Primary Examiner*—Georgia Y. Epps
*Assistant Examiner*—Muhammad N. Edun
*Attorney, Agent, or Firm*—Limbach & Limbach

[57] ABSTRACT

An optical disc apparatus includes a rotary encoder (14) for detecting a rotation of a spindle motor (12) that rotates an optical disc (11). A counter (16) generates a timing pulse ($P_3$) per rotation of the optical disc (11) in synchronism with an output timing pulse ($P_1$) of the rotary encoder (14). When the timing pulse ($P_3$) is generated, in other words, one revolution of the optical disc (11) is specified, an optical pickup (21) is returned by one track amount in an inner peripheral direction (Ri) of the optical disc (11) in synchronism therewith. Therefore, even when an optical disc is an optical disc having tracks in which a length of one track is made different from a length of physical one round, the optical pickup (21) can be maintained in a still condition (also called on-track condition).

2 Claims, 4 Drawing Sheets

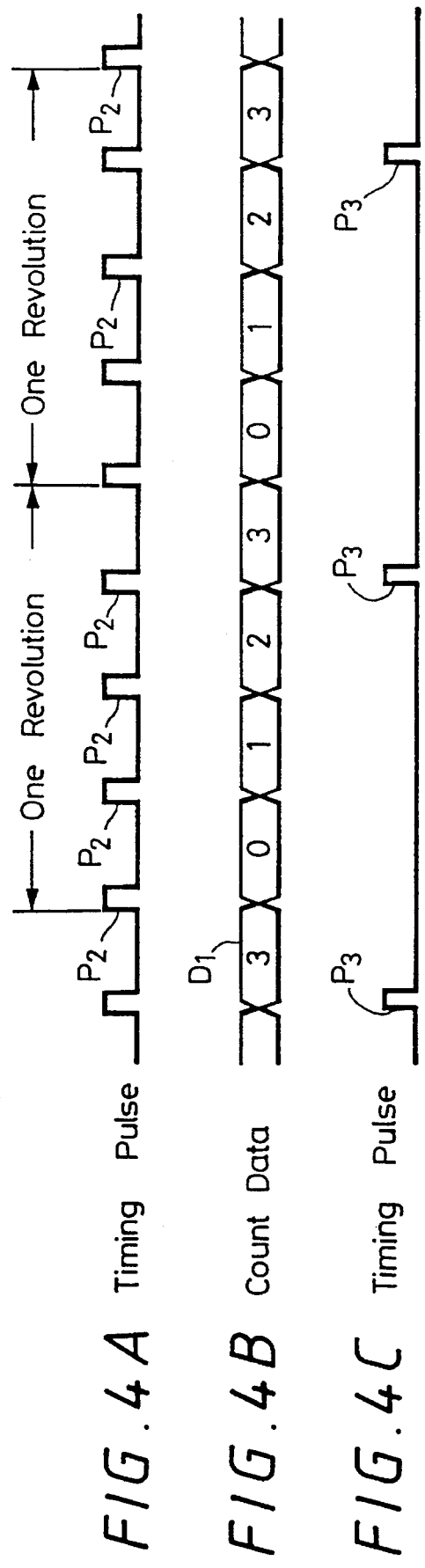

OPTICAL PICKUP CONTROL APPARATUS

This is a continuation of application Ser. No. 08/047,231, filed on Apr. 14, 1993, now abandoned.

BACKGROUND OF THE INVENTION

1. Field of the Invention

The present invention relates to an optical disc apparatus in which an optical pickup can be maintained in a still condition (also called the on-track condition) over an optical disc.

2. Description of the Relevant Art

In optical disc apparatus, when an optical pickup traces an optical disc, rotated by a spindle motor, in a radial direction from inner to outer peripheral sides of the optical disc, an information signal recorded on the optical disc is read out by the optical pickup.

One of requirements of such optical disc apparatus is to repetitively reproduce an information signal recorded on a particular track of the optical disc, i.e., to maintain an optical pickup in a so-called still condition (also called on-track condition). According to the above still condition maintaining operation, when the optical disc is rotated by one track amount (one revolution) while the optical disc is being reproduced by the optical pickup, the optical pickup is moved by one track amount toward the inner peripheral direction along the radial direction of the optical disc, whereby the optical pickup is positioned over the same track on standby.

FIG. 1 of the accompanying drawings shows an example of a recording format of a magneto-optical disc that is one of optical discs now commercially available on the market. As shown in FIG. 1, a magneto-optical disc 1 has recording grooves that are spirally extended from an inner peripheral side to an outer peripheral side of a radial direction R. Although the recording grooves are spirally formed, one round of the recording groove is referred to as one track and the recording grooves are numbered by track numbers "nT" at every recording groove as 0T, 1T, ..., 10T, 11T, ... from the inner peripheral side in that order. Further, each track is divided into sectors S at an equal angular interval and the sectors S are sequentially numbered by sector numbers "nS" (e.g., 0S to 5S in the clockwise direction as shown in FIG. 1).

The arbitrary sector S comprises a header H and data D. On the header H, there is recorded in advance an address information having the aforesaid track number "nT" and sector number "nS" by an embossing treatment. In the magneto-optical disc 1 shown in the example of FIG. 1, address information from "10T0s" (sector 0 of 10'th track) to "11T5S" (sector 5 of 11'th track) are recorded on each respective header H. On the other hand, actual data information is recorded on the data D. Therefore, the information signal recorded on the magneto-optical disc 1 includes an address information and the data information.

The magneto-optical disc 1 thus arranged is rotated about a rotary shaft by a spindle motor (not shown) at a constant angular velocity (CAV), for example, in the direction shown by an arrow A in FIG. 1. The optical pickup 2 disposed in an opposing relation to the magneto-optical disc 1 is moved in the direction shown by an arrow R in FIG. 1 (in the radial direction of the magneto-optical disc 1), whereby contents of the header H and the data D which are the information signals within the sector S are read out from the magneto-optical disc 1.

In order to maintain the optical pickup 2 in the still condition over the magneto-optical disc 1 having the aforesaid recording format, the sector number "nS" within the header H is read out by the optical pickup 2. Then, when the sector number "nS" is changed from the sector number "5S" to the sector number "0S", there is generated a timing pulse and the optical pickup 2 is moved one track amount toward the inner peripheral side of the magneto-optical disc 1 in response to the timing pulse thus generated. This operation is called a one track jump operation. Alternatively, when the predetermined sector number of the sector number "nS", e.g., sector number "5S" is read out, there is generated a timing pulse and the optical pickup 2 is moved by one track amount toward the inner peripheral side of the magneto-optical disc 1 in response to the timing pulse.

In the magneto-optical disc 1 thus formatted as shown in the example of FIG. 1, one track corresponds physical to one disc revolution in a one-to-one relation (1:1). Also, the number of sectors within each track is equal. In other words, a sector structure is synchronized with one physical track.

Recently, there is proposed an optical disc which includes tracks, each of which has a (1/1.5) round to (½) round relationship, for example, relative to a physical track of one round (hereinafter referred to as a physical track), in other words, a track (hereinafter referred to as a logical track) in which a length of one logical track becomes less than the physical length of one round in the circumferential direction, i.e. less than the length of a physical track. The reason for this is that a recording density of the optical disc can be increased by selecting the physical length of the circumferential direction of the logical track to be substantially a constant length. Even when a track that has an asynchronous sector structure is formed, the number of sectors within each logical track is selected to be equal in order to facilitate the data processing or the like.

In the optical disc in which the logical tracks are formed as described above, it is frequently observed that the same sector number exists multiple times within one physical track. Therefore, when the optical disc is rotated by one physical track amount (one revolution) while the sector number is being read out, if the optical pickup is operated under the control of the conventional optical disc apparatus in which the optical pickup is maintained in the still condition (on-track condition) by moving the optical pickup by one physical track in the inner peripheral direction along the radial direction of the optical disc, then the optical pickup is sequentially moved toward the inner peripheral side of the optical disc so that the optical pickup cannot be maintained in the still condition.

OBJECTS AND SUMMARY OF THE INVENTION

Therefore, it is an object of the present invention to provide an improved optical disc apparatus in which the aforesaid shortcomings and disadvantages encountered with the prior art can be eliminated.

More specifically, it is an object of the present invention to provide an optical disc apparatus in which an optical pickup can be maintained in a still condition (also called the on-track condition) even when an optical disc is an optical disc having tracks in which a length of one track is different from a physical length of one round.

According to an aspect of the present invention, there is provided an optical disc apparatus for driving an optical disc in which a plurality of sectors, on which an information signal is recorded, are physically provided in a spiral fashion. The optical disc apparatus comprises a spindle motor for rotating said optical disc, a rotation detecting circuit for detecting a rotation of the spindle motor, an optical pickup disposed in an opposing relation to a disc surface of the optical disc for moving a reproducing light beam in the radial direction of the optical disc, and a driver for driving the optical pickup so that the optical pickup moves the light beam by one track amount in an inner or outer peripheral (i.e. radial) direction so that the light beam traces the same track when the rotation detecting circuit detects one revolution of the optical disc.

According to the optical disc apparatus of the present invention, when one rotation of the optical disc is specified by the output from the sensor that detects the rotation of the spindle motor rotating the optical disc, the optical pickup is returned by one track amount in the inner peripheral direction of the optical disc. Thus, even when an optical disc is the optical disc in which the length of one logical track is made different from the length of one physical track, the optical pickup can be reliably maintained in the still condition.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 4A through 4C are respectively diagrams of waveforms of timing pulses and count data used to explain operation of the optical disc apparatus shown in FIG. 2.

DETAILED DESCRIPTION OF THE PREFERRED EMBODIMENT

The present invention will now be described with reference to the drawings.

Figure 2:
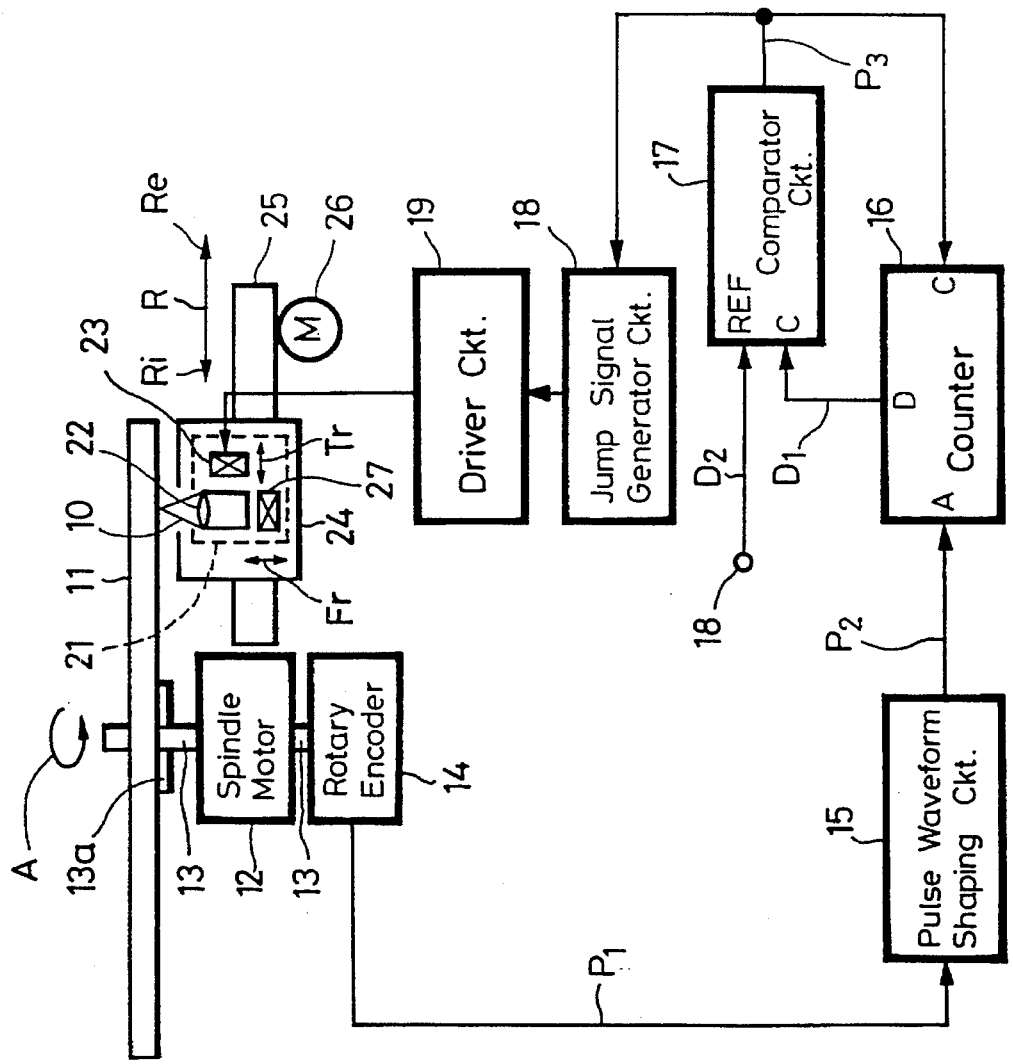
FIG. 2 is a diagram showing an arrangement of an optical disc apparatus according to an embodiment of the present invention.
Figure 3:
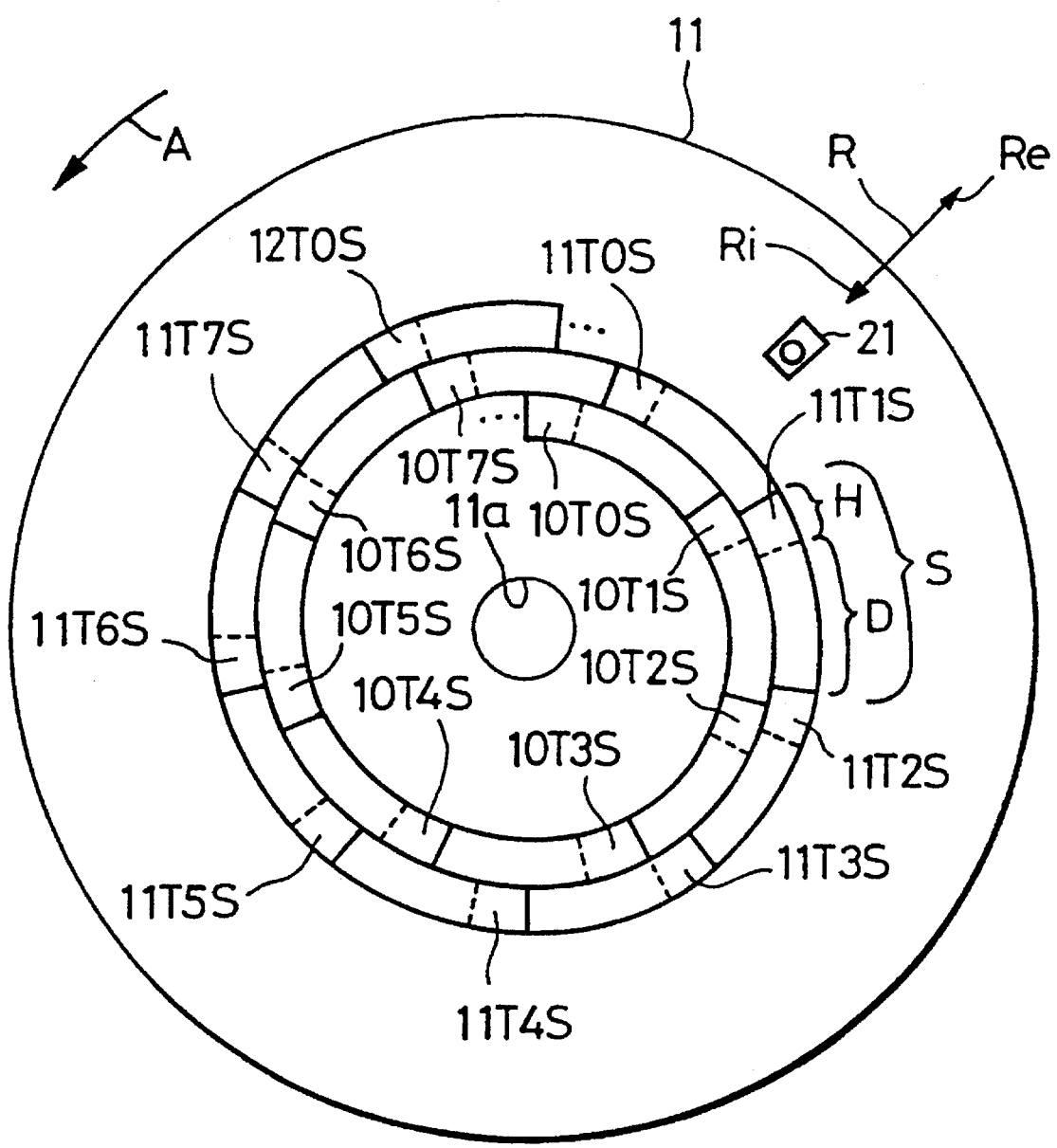
FIG. 3 is a diagram used to explain an example of a recording format of an optical disc that is applied to the optical disc apparatus shown in FIG. 2.

FIG. 2 schematically shows an arrangement of an optical disc apparatus according to an embodiment of the present invention. In FIG. 2, reference numeral 11 designates an optical disc. FIG. 3 shows a recording format of the optical disc 11. The optical disc 11 includes recording grooves that are formed spirally from the inner to outer peripheral sides thereof along the radial direction R. The optical disc 11 is not limited to a writable optical disc such as a magneto-optical disc or the like and may be any one of a write-once optical disc and a read-only optical disc. In FIG. 3, reference numeral 11a depicts a spindle aperture of the optical disc 11. When this spindle aperture 11a is inserted into a cylindrical spindle 13 of the optical disc apparatus shown in FIG. 2, the optical disc 11 is positioned and then loaded onto a turntable 13a.

Figure 1:
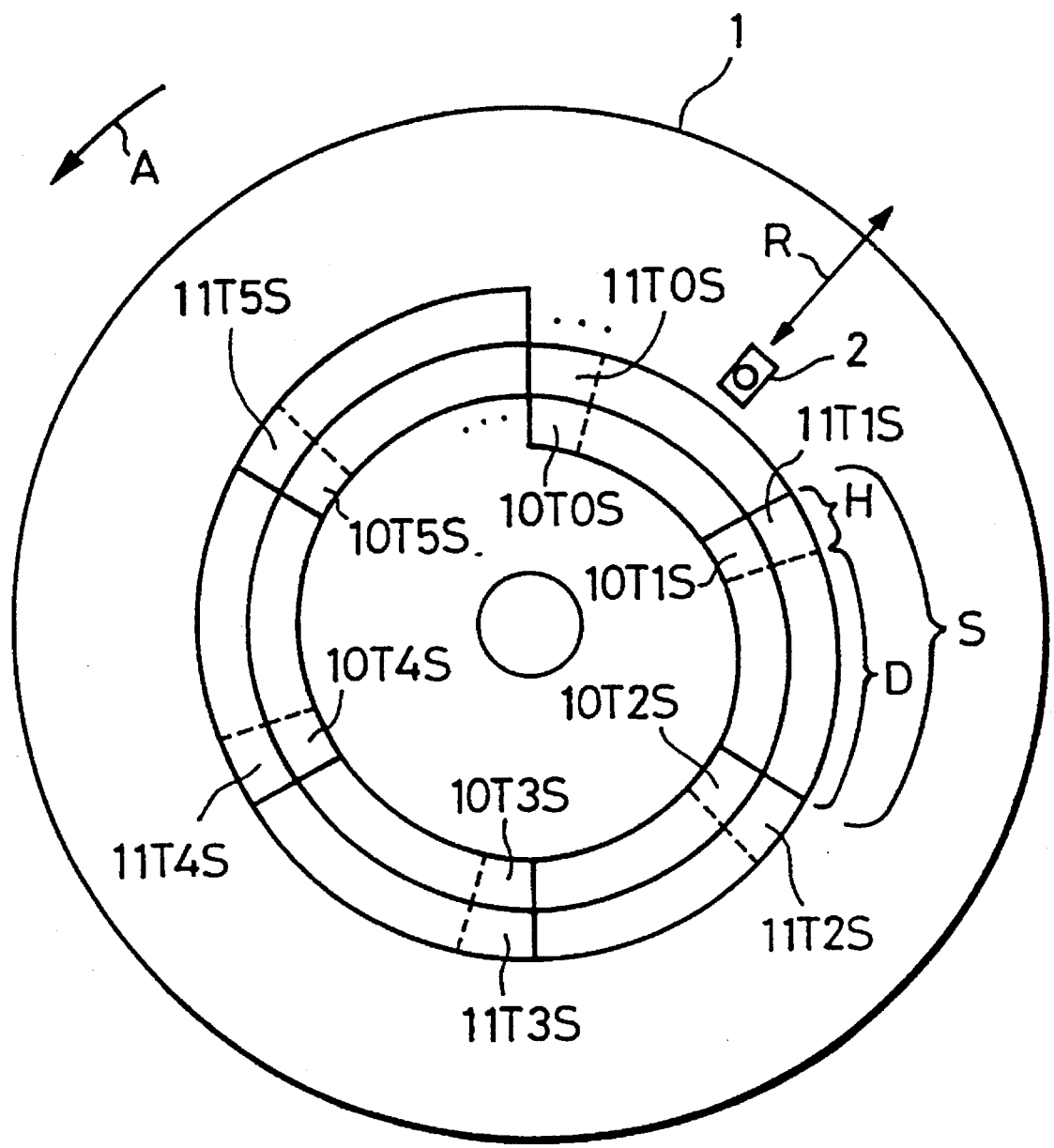
FIG. 1 is a diagram used to explain a recording format of a magneto-optical disc of optical discs that are commercially available on the market.

The optical disc 11 shown in FIGS. 2 and 3 includes logical tracks formed such that the length of one track becomes less than a length of one round of the physical length in the circumferential direction (i.e. one physical track). Therefore, high density recording becomes possible in the optical disc 11 as compared with the magneto-optical disc 1 shown in FIG. 1.

In the embodiment shown in FIG. 3, each logical track is taken as one unit and the track number "nT" is assigned to the optical disc 11 from the inner periphery as 0T, 1T, ... , 10T, 11T, 12T, ... . Further, each logical track is divided to provide eight sectors S each of which is equal in length in the circumferential direction. These sectors S are numbered by the sector number "nS" (0S to 7S in the clockwise direction). Since the lengths of the sectors S in the circumferential direction are equal, the lengths of the respective logical tracks in the circumferential direction also are equal.

The arbitrary sector S comprises the header H and the data D. The track number "nT" and the sector number "nS" are recorded in advance on the header H. In the optical disc 11 shown in the example of FIG. 3, address information from "10T0S" (sector 0 of the 10'th track) to "12T0S" (sector 0 of 12'th track) are recorded respectively on each header.

The optical disc 11 thus arranged is rotated about the spindle 13 by the spindle motor 12 at a constant angular velocity (CAV) in the arrow A direction on the basis of a speed command signal from a host computer (not shown).

An optical pickup 21 for irradiating the optical disc 11 with a light beam 10 to write and/or read an optical information is disposed in an opposing relation to a disc surface of the rotating optical disc 11.

The optical pickup 21 has an objective lens 22 secured to a bobbin (not shown). The objective lens 22 is moved at high speed in the tracking direction (same direction as the radial direction R) Tr by a tracking coil 23 fixed to the bobbin. Also, the objective lens 22 is moved at high speed in the focusing direction (direction perpendicular to the disc surface) Fr by a focusing coil 27 fixed to the bobbin. That is, the optical pickup 21 is operated as a so-called visual field pickup that is a bi-axial device. A control circuit for the focusing servo system that operates the focusing coil 27 in a predetermined manner and the tracking servo system that operates the tracking coil 23 in a predetermined manner is well known and need not be shown for simplicity.

The optical pickup 21 thus arranged is fixed to an optical base 24 and the optical base 24 is guided along a guide rail 25 in the radial direction R by a feed motor 26. In actual practice, the feed motor 26 and the guide rail 25 are constructed in the form of a so-called linear motor.

The spindle 13 of the spindle motor 12 has a rotary encoder 14, serving as a sensor, integrally formed therewith to generate four timing pulses $P_1$ per revolution. The rotary encoder 14 can be constructed to employ a Hall element or photo-sensor. The timing pulse $P_1$, which is an output signal of the rotary encoder 14, is waveform-shaped by a pulse waveform shaping circuit 15 and is thereby converted into a timing pulse $P_2$ of a square wave pulse. The number of timing pulse $P_1$ and the number of timing pulse $P_2$ are the same. That is, per rotation of the spindle 13 of the spindle motor 12, i.e., per rotation of the optical disc 11, there are generated four timing pulses $P_2$ from the pulse waveform shaping circuit 15.

FIG. 4A shows a waveform of the timing pulse $P_2$. The timing pulse $P_2$ is supplied to a count input terminal A of a counter 16. Count data $D_1$ is supplied from a data output terminal D of the counter 16 to a comparing input terminal C of a comparator circuit 17.

FIG. 4B shows a value of count data $D_1$ in a time series fashion. That is, each time the timing pulse $P_2$ is supplied to the count input terminal A of the counter 16, the value of the count data $D_1$ is changed one by one.

The comparator circuit 17 is supplied at its reference input terminal REF with reference data $D_2$ from a host computer (not shown) through a terminal 18. A value of the reference data $D_2$ is expressed as $D_2= 3$. That is, when the count data $D_1$ of the counter 16 becomes equal to 3 ($D_1= 3$), the comparator circuit 17 generates one timing pulse $P_3$.

FIG. 4C shows a waveform of the timing pulse $P_3$. As is clear from FIG. 4C, one timing pulse $P_3$ is generated per four timing pulses $P_2$ ($P_1$). In other words, one timing pulse $P_3$ is generated per revolution of the spindle 13 of the spindle motor 12, i.e., one physical rotation (physical track) of the optical disc 11.

The timing pulse $P_3$ is supplied to a clear input terminal C of the counter 16 and to a jump signal generator circuit 18. The counter 16 is reset in response to the timing pulse $P_3$.

An output signal of the jump signal generator circuit 18 is supplied to a driver circuit 19. When an output signal of the driver circuit 19 is supplied to the tracking coil 23 of the optical pickup 21, the objective lens 22 is returned by one physical track amount in an inner peripheral direction Ri of the radial direction R in synchronism therewith. Depending upon the format of the optical disc and the design of the optical disc apparatus, the optical pickup 21 may be moved by one physical track in the outer peripheral side so as to trace the same track, if necessary.

The objective lens 22 can be returned by one physical track in the inner peripheral direction Ri with ease by utilizing well-known techniques that are disclosed in U.S. Pat. Nos. 4,332,022 and 4,006,394.

According to the above-described embodiment, a rotation of the optical disc 11 is detected by a rotary encoder 14, rather than from reading sector numbers from the header H portions of the optical disc 11.

The timing pulse $P_3$ that is generated per revolution of the optical disc 11 is obtained on the basis of the output timing pulse $P_1$ of the rotary encoder 14. When the timing pulse $P_3$ is generated, in other words, one physical rotation of the optical disc 11 is specified, the optical pickup 21 is returned by one physical track amount in the inner peripheral direction Ri of the optical disc 11 in synchronism therewith. Therefore, even when the optical disc is the optical disc 11 that has the logical track in which one track length is made different from the length of one physical round, the optical pickup 21 can be reliably maintained in the still condition. Of course, the optical pickup 21 can be maintained in the still condition even when the optical disc is the magneto-optical disc 1 having the recording format shown in FIG. 1.

If the rotary encoder 14 is of the type such that it generates one timing pulse $P_1$ per rotation, the output timing pulse $P_2$ of the pulse waveform shaping circuit 15 may directly be supplied to the jump signal generator circuit 18. In that case, the counter 16 and the comparator circuit 17 become unnecessary.

As set out above, according to the optical disc apparatus of the present invention, when one rotation of the optical disc is specified by the output from the sensor that detects the rotation of the spindle motor rotating the optical disc, the optical pickup is returned by one physical track amount in the inner peripheral direction of the optical disc. There is then the advantage such that even when the optical disc is the optical disc in which the length of one track is made different from the length of one physical round in the circumferential direction, the optical pickup can be reliably maintained in the still condition.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An optical disc apparatus for driving an optical disc in which a plurality of sectors on which an information signal is recorded are physically provided in spiral tracks, the optical disc apparatus comprising:

a spindle motor having a spindle for rotating the optical disc;

rotation detecting means for detecting a rotation of the spindle of the spindle motor and, responsive thereto, outputting a control signal with each complete rotation of the spindle of the spindle motor;

an optical pickup disposed in an opposing relation to a disc surface of the optical disc for moving a reproducing light beam in the radial direction of the optical disc; and driving means for driving the optical pickup so that the control signal directly causes the optical pickup to move the light beam by one track in the radial direction of the optical disc so that the light beam retraces the same track wherein:

the optical pickup includes an objective lens for causing the light beam to be focused on the disc surface, the optical pickup including a tracking means for moving the objective lens in the radial direction of the optical disc, the movement of the light beam by one track in the radial direction of the optical disc being accomplished by the driving means actuating the tracking means so that the objective lens is moved in the radial direction; and the rotation detecting means includes an encoder for generating a plurality of pulses per rotation of the spindle of the spindle motor so that each pulse of the plurality of pulses is generated in response to the rotation of the spindle motor, a counter for counting pulses from the encoder and comparing means for comparing count data from the counter with reference data, and the rotation detecting means detects one rotation of the spindle motor when the comparing means detects that the count data and the reference data become coincident with each other.

2. In combination, an optical disc and an apparatus for driving the optical disc comprising:

an optical disc in which a plurality of sectors in which an information signal is recorded are provided in spiral tracks, each spiral track having the same number of sectors which are equal in length taken in a circumferential direction;

a spindle motor having a spindle for rotating the optical disc;

rotation detecting means for detecting a rotation of the spindle motor and, responsive thereto, outputting a control signal with each complete rotation of the spindle of the spindle motor;

an optical pickup disposed in an opposing relation to a disc surface of the optical disc for moving a reproducing light beam in the radial direction of the optical disc; and driving means supplied with the control signal for driving the optical pickup so that the control signal directly causes the optical pickup to move the light beam by one track in the radial direction of the optical disc so that the light beam retraces the same track.

* * * * *